United States Patent
Milanesi et al.

(10) Patent No.: US 9,763,296 B1
(45) Date of Patent: Sep. 12, 2017

(54) MULTIFUNCTION DC TO DC DRIVER

(71) Applicant: Infineon Technologies AG, Neubiberg (DE)

(72) Inventors: Paolo Milanesi, Padua (IT); Roberto Penzo, Chioggia (IT); Maurizio Galvano, Padua (IT); Fabio Fragiacomo, Montegrotto Terme (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/183,551

(22) Filed: Jun. 15, 2016

(51) Int. Cl.
| H05B 37/00 | (2006.01) |
| H05B 33/08 | (2006.01) |
| H02M 3/158 | (2006.01) |

(52) U.S. Cl.
CPC ...... *H05B 33/0815* (2013.01); *H02M 3/1582* (2013.01); *H05B 33/083* (2013.01); *H05B 33/0824* (2013.01); *H05B 33/0827* (2013.01); *H05B 33/0845* (2013.01)

(58) Field of Classification Search
CPC ............ H05B 33/0815; H05B 33/0824; H05B 33/083; H05B 33/0845; H05B 33/0827
USPC .......................... 315/186, 192, 294, 307, 308
See application file for complete search history.

(56) References Cited

U.S. PATENT DOCUMENTS

| 7,800,316 | B2 * | 9/2010 | Haug ................... | H05B 33/083 315/299 |
| 8,174,212 | B2 * | 5/2012 | Tziony ............... | H05B 33/0815 315/122 |
| 8,456,095 | B2 * | 6/2013 | Huynh ................. | H05B 33/083 315/209 R |
| 9,035,575 | B2 * | 5/2015 | Lee .................... | H05B 33/0824 315/315 |
| 9,131,569 | B2 * | 9/2015 | van de Ven | |
| 2006/0038803 | A1 * | 2/2006 | Miller ................ | H05B 33/0815 345/204 |
| 2011/0109247 | A1 * | 5/2011 | Hoogzaad .......... | H05B 33/0818 315/294 |
| 2012/0091920 | A1 * | 4/2012 | Yang .................. | H05B 33/0824 315/320 |
| 2015/0115811 | A1 * | 4/2015 | Bradford ............ | H05B 33/0848 315/186 |
| 2015/0256071 | A1 | 9/2015 | Penzo et al. | |
| 2016/0353531 | A1 * | 12/2016 | Conner ............. | H05B 33/0833 |

* cited by examiner

*Primary Examiner* — Tung X Le
(74) *Attorney, Agent, or Firm* — Shumaker & Sieffert, P.A.

(57) ABSTRACT

In one example, a system includes a load module, a voltage module, and a controller. The load module is configured to selectively bypass each load unit of a plurality of load units to form a series string of load units. The voltage module is configured to output a voltage across the series string of load units that is based on a target voltage. The controller is configured to output an indication of the target voltage, estimate a time delay for switching one or more load units of the plurality of load units, and output, after outputting the indication of the target voltage for the time delay, a control signal to switch one or more load units of the plurality of load units such that the series string of load units has the target quantity of load units.

20 Claims, 10 Drawing Sheets

MULTIFUNCTION DC TO DC DRIVER

TECHNICAL FIELD

This disclosure relates a driver, such as a light emitting diode driver, that is configured to control a voltage supplied to a load, such as a string of light emitting diodes.

BACKGROUND

Drivers may control a voltage at a load. For instance, a light emitting diode (LED) driver may control a voltage supplied to a string of light emitting diodes. Some drivers may include a direct current (DC) to DC converter, such as a buck-boost, buck, boost, or another DC to DC converter. Such DC to DC converters may be required to change the voltage at the load based on a characteristic of the load. For instance, when operating front lighting of an automobile in a high beam mode, the string of light emitting diodes may require a higher voltage than when operating in a low beam mode.

SUMMARY

In general, this disclosure is directed to techniques for reducing a current overshoot and undershoot in a load when changing a quantity of load units. For example, in an exemplary automotive application, a light emitting diode (LED) driver may change a quantity of active light emitting diodes in a string of light emitting diodes from a first quantity for a first mode (e.g., high beam) to a second quantity for a second mode (e.g., low beam) such that a current overshoot and undershoot is minimized. More specifically, in some examples, the light emitting diode driver may delay when switching the string of light emitting diodes from the first quantity for the first mode to the second quantity for the second mode in order to reduce the current overshoot and undershoot. In some examples, the light emitting diode driver may actively drive a current into or from an energy storage element of a direct current (DC) to DC converter to reduce the current overshoot and undershoot. In any case, reducing current undershoot can reduce a deterioration of the performance of the system and reducing current overshoot can prevent damage to the load.

In an example, a system includes a load module, a voltage module, and a controller. The load module is configured to selectively bypass each load unit of a plurality of load units to form a series string of load units. The voltage module is configured to receive, at a control input of the voltage module, an indication of a target voltage and supply an output voltage across the series string of load units that is based on the target voltage. The controller is configured to determine a target quantity of load units used to form the series string of load units, the target quantity of load units being different from a current quantity of load units used to form the series string of load units, determine the target voltage based on the target quantity of load units, output, to the control input of the voltage module, the indication of the target voltage, estimate a time delay for switching one or more load units of the plurality of load units such that the series string of load units has the target quantity of load units, and output, after outputting the indication of the target voltage for the time delay and to the load module, a control signal to switch one or more load units of the plurality of load units such that the series string of load units has the target quantity of load units.

In another example, a method includes determining, by a processor, a target quantity of load units used to form the series string of load units, the target quantity of load units being different from a current quantity of load units used to form the series string of load units and determining, by the processor, a target voltage based on the target quantity of load units. The method further includes outputting, by the processor and to a voltage module configured to supply an output voltage across the string of load units that is based on the target voltage, an indication of the target voltage, estimating, by the processor, a time delay for switching one or more load units such that the series string of load units has the target quantity of load units, and outputting, by the processor and to the load module, after outputting the indication of the target voltage for the time delay, a control signal to switch one or more load units such that the series string of load units has the target quantity of load units.

In another example, a circuit includes a load module, a voltage module, and a feedforward module. The load module is configured to selectively bypass each load unit of a plurality of load units to form a series string of load units. The voltage module is configured to supply an output voltage across the series string of load units that is based on a voltage of a capacitor. The feedforward module is configured to receive an indication of a current quantity of load units used to form the series string of load units and receive an indication of a target quantity of load units used to form the series string of load units. The target quantity of load units is different from the current quantity of load units of the series string of load units. The feedforward module is further configured to detect the voltage of the capacitor, output a target voltage for the capacitor that is based on the current quantity, the target quantity, and the voltage of the capacitor, and modify, using the output, an energy level of the capacitor such that the voltage of the capacitor corresponds to the target voltage.

Details of these and other examples are set forth in the accompanying drawings and the description below. Other features, objects, and advantages will be apparent from the description and drawings, and from the claims.

DETAILED DESCRIPTION

Figure 1:
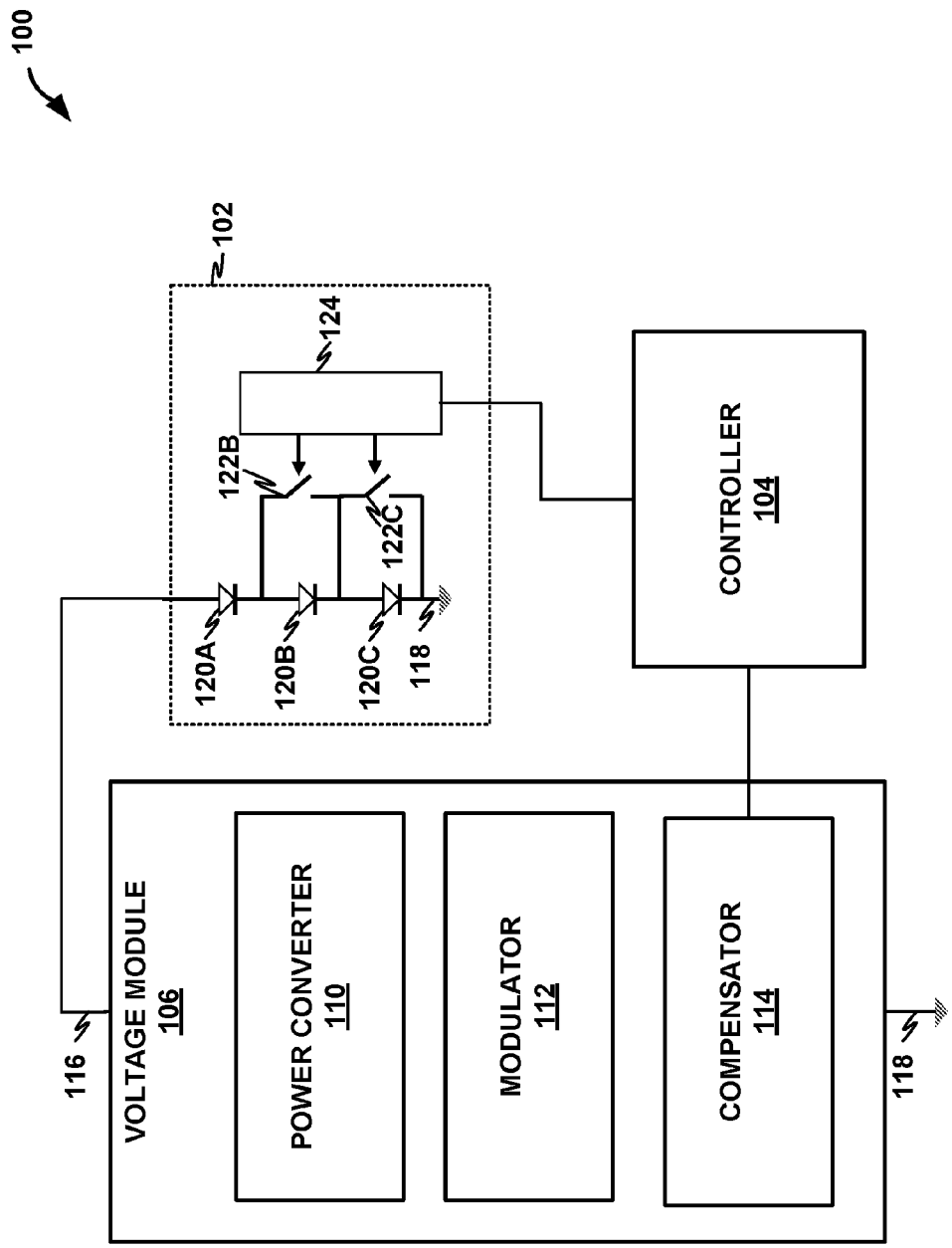
FIG. 1 is a block diagram illustrating an example system configured to estimate a time delay for switching load units, in accordance with one or more techniques of this disclosure.

Some systems may use a direct current (DC) to DC converter to control a voltage supplied to a load. A voltage output by the DC to DC converter may be controlled using a compensation capacitor. For example, as the voltage of the compensation capacitor increases, a duty cycle of the DC to DC converter may increase, thereby increasing a voltage supplied to the load and as the voltage of the compensation capacitor decreases, the duty cycle of the DC to DC converter may decrease, thereby decreasing the voltage supplied to the load. In some examples, a voltage of the compensation capacitor is not accounted for when changing the voltage at the load. For example, in an exemplary automotive application, a light emitting diode (LED) driver may switch a string of light emitting diodes from the high beam mode to a low beam mode and output, to the DC to DC converter, target voltage for the compensation capacitor. However, in the example, the DC to DC converter may supply a voltage at the string of light emitting diodes that causes a current at the string of light emitting diodes to overshoot and/or undershoot the desired current since the compensation capacitor may not immediately have a voltage equal to the target voltage for the compensation capacitor. More specifically, the compensation capacitor must increase or decrease an energy stored in an electric field of the compensation capacitor before having a voltage equal to the target voltage for the compensation capacitor, which causes the DC to DC converter to supply a current to the string of light emitting diodes that is different than the desired current.

In some examples, the driver may estimate a time delay for switching a load to account for charging and discharging the compensation capacitor of a DC to DC converter. For example, a driver may estimate the time delay for switching the load based on a difference of voltage between the target voltage for the compensation capacitor and a current voltage for the compensation capacitor. In this manner, the driver may switch in the load when the compensation capacitor has a voltage that is approximately equal to the target voltage for the compensation capacitor, rather than a voltage that is substantially different than the target voltage for the compensation capacitor. As such, the DC to DC converter may supply a voltage to the load that results in a current that is substantially similar to the desired current, thereby resulting in a reduction in current undershoot and/or overshoot compared to a DC to DC converter that initially supplies a voltage at the load that results in a current that is different than the desired current.

In some examples, the driver may directly modify the energy level of the compensation capacitor of a DC to DC converter such that the compensation capacitor has a voltage substantially equal to a target voltage for the compensation capacitor when the driver switches in the load. For example, the driver may include a feedforward module that actively charges and/or discharges the compensation capacitor such that the energy stored in an electric field of the compensation capacitor corresponds to a voltage that is substantially equal to the target voltage for the compensation capacitor. In this manner, the time delay for switching the load may be reduced to such that the driver may switch in the load approximately simultaneously to the driver modifying the energy level of the compensation capacitor and still ensure that the compensation capacitor has a voltage that is approximately equal to the target voltage for the compensation capacitor. Accordingly, a driver that modifies the energy level of the compensation capacitor of a DC to DC converter may result in a less current undershoot and/or overshoot of current supplied to a load compared to a driver that does not modify the energy level of the compensation capacitor.

FIG. 1 is a block diagram illustrating an example system 100 configured to estimate a time delay for switching load units, in accordance with one or more techniques of this disclosure. As illustrated in the example of FIG. 1, system 100 may include load module 102, controller (e.g., driver) 104, voltage module 106, voltage rail 116, and reference node 118. In some examples, reference node 118 may be a ground, earth ground, ground plane, or another reference point of system 100.

Load module 102 may include load units 120A, 120B, 120C (collectively "load units 120"), switching elements 122B and 122C (collectively "switching elements 122"), and a multifunctional switching unit 124. Although FIG. 1 illustrates load module 102 as including three load units 120, load module 102 may include any suitable number of load units 120. For example, load module 102 may include fewer load units 120 (e.g., only load unit 120A, only load unit 120B, only load units 120A and 120B) or more load units 120 (e.g., four, five, six, or more). Additionally, although FIG. 1 illustrates load module 102 as including two switching elements 122, load module 102 may include any suitable number of switching elements 122. For example, load module 102 may include fewer switching elements 122 (e.g., only switching element 122B, only switching element 122C) or more switching elements 122 (e.g., four, five, six, or more). In some examples, load unit 120A may have a corresponding switching element 122A. Although, the exemplary load module 102 of FIG. 1 illustrates load module 102 as including multifunctional switching unit 124, in some examples, multifunctional switching unit 124 may be omitted.

Load units 120 may be any device configured to receive a voltage output from voltage module 106. In some examples, load units 120 may be light emitting diodes. As used herein, light emitting diodes may refer to any semiconductor light source. In some examples, load units 120 may be light emitting diodes that include a p-n junction configured to emit light when activated. In an exemplary application, load units 120 may be light emitting diodes included in a headlight assembly for automotive applications. For instance, load units 120 may be a matrix of light emitting diodes to light the road ahead of an automotive vehicle. In some examples, load units 120 may be associated with one or more operational modes. For example, load module 102 may be configured to operate a first combination of load units 120 (e.g., light emitting diodes) to operate in a low beam mode and to operate a second combination of load units 120 (e.g., light emitting diodes) to operate in a high beam mode. In some instances, a mode of load units 120 may be digitally controlled, for example, by load module 102, for adaptive functionality. For instance, in the automotive examples, in response to system 100 detecting oncoming automobiles, system 100 may change load units 120 from operating in a high beam mode to a low beam mode and in response to system 100 detecting no oncoming automobiles, system 100 may change load units 120 from operating in the low beam mode to the high beam mode.

Switching elements 122 may include any device suitable to permit current to bypass a corresponding load unit of load units 120. For example, switching element 122B may be switched in such that current output from load unit 120A flows through switching element 122B instead of load unit 120B. Examples of switching elements 122 may include, but are not limited to, silicon controlled rectifier (SCR), a Field Effect Transistor (FET), and bipolar junction transistor (BJT). Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, PMOS, NMOS, DMOS, or any other type of MOSFET, or any combination of the same. Examples of BJTs may include, but are not limited to, PNP, NPN, heterojunction, or any other type of BJT, or any combination of the same. It should be understood that switching elements 122 may be a high side switch or low side switch. Additionally, switching elements 122 may be voltage-controlled and/or current-controlled. Examples of current-controlled switching elements may include, but are not limited to, gallium nitride (GaN) MOSFETs, BJTs, or other current-controlled elements.

Multifunctional switching unit 124 may be configured to drive switching elements 122. For example, multifunctional switching unit 124 may include one or more driver circuits configured to deactivate (e.g., switch out) and activate (e.g., switch in) each switching element of switching elements 122. In some examples, multifunctional switching unit 124 may drive switching elements 122 according to a signal received from controller 104. For example, in response to multifunctional switching unit 124 receiving an instruction to switch in switching elements 122A and B and switch out switching elements 122C, multifunctional switching unit 124 may drive a first signal (e.g., high voltage) to a control node (e.g., gate) of switching elements 122A and 122B to switch in switching elements 122A and 122B and may drive a second signal (e.g., low voltage) to a control node (e.g., gate) of switching element 122C to switch out switching element 122C. In some examples, multifunctional switching unit 124 may be configured to receive an instruction indicating an operational state (e.g., switched in, switched out) for each switching element of switching elements 122. For instance, controller 104 may output, to multifunctional switching unit 124, a first signal (e.g., high voltage) to indicate an instruction for a respective switch to switch in or a second signal (e.g., low voltage) to indicate an instruction for the respective switch to switch out. In some examples, multifunctional switching unit 124 may be configured to receive an instruction indicating an operational state (e.g., high beam mode, low beam mode, or another operational state) for switching elements 122 itself. For instance, controller 104 may output, to multifunctional switching unit 124, a first signal (e.g., low voltage) to indicate an instruction for multifunctional switching unit 124 to operate switching elements 122 for a low beam mode (e.g., switching out switching element 122A and switching in switching element 122B-C) or a second signal (e.g., high voltage) to indicate an instruction for multifunctional switching unit 124 to operate switching elements 122 for a high beam mode (e.g., switching out switching elements 122A-C).

Controller 104 may be configured to control load module 102 to switch in and switch out load units 120. In some examples, controller 104 may control voltage module 106 to output a voltage and/or current to load module 102. In some examples, controller 104 may include an analog circuit. In some examples, controller 104 may be a microcontroller on a single integrated circuit containing a processor core, memory, inputs, and outputs. For example, controller 104 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, controller 104 may be a combination of one or more analog components and one or more digital components.

Voltage module 106 may be configured to output a voltage to load module 102. As shown, voltage module 106 may include a power converter 110, a modulator 112, and a compensator 114. In some examples, voltage module 106 may be or include a DC to DC power converter.

Power converter 110 may be configured to receive a first voltage and output a second voltage to load module 102. In some examples, power converter 110 may regulate a voltage output to load module 102. In some examples, power converter 110 may regulate a current output to load module 102. Power converter 110 may include one or more switch-mode power converters including, but are not limited to, flyback, buck-boost, buck, auk, or the like. Power converter 110 may include one or more switching elements to switch in and out one or more energy storage components (e.g., inductor, capacitor, or another energy storage component).

Modulator 112 may be configured to control a voltage and/or current output by power converter 110. In some examples, modulator 112 may output a switching signal to switch in or switch out one or more switching elements of power converter 110. In some examples, modulator 112 may compare a received voltage with a reference signal. For instance, in response to determining that a received signal is greater than an instantaneous voltage of an offset triangle signal (e.g., sawtooth), modulator 112 may output a first signal (e.g., high signal) to cause power converter 110 to switch in the one or more energy storage elements and in response to determining that a received signal is less than or equal to an instantaneous voltage of the offset triangle signal, modulator 112 may output a second signal (e.g., low signal) to cause power converter 110 to switch out the one or more energy storage elements. In some examples, modulator 112 may compare a reference signal and a voltage of a compensation capacitor.

Compensator 114 may output a voltage to modulator 112 for controlling a voltage output by voltage module 106. For example, compensator 114 may output, to modulator 112, a voltage that is based on a comparison of an estimated current output from voltage module 106 and a reference voltage. More specifically, in some instances, compensator 114 may output, to modulator 112, a voltage that is based on a difference of an estimated current output from voltage module 106 and a reference voltage received from controller 104. In some examples, compensator 114 may include an operation amplifier to estimate the current output from voltage module 106. In some examples, compensator 114 may include an operation amplifier to increase a voltage of a signal indicating the difference between the estimated current output from voltage module 106 and the reference voltage received from controller 104. In some examples, compensator 114 may output a voltage to a compensation capacitor that is coupled to the input of modulator 112.

In accordance with one or more techniques, controller 104 may determine a target quantity number of load units 120 used to form a series string of load units. For example, controller 104 may receive (e.g., from a user interaction with system 100) an indication to change a mode of the system 100 from a high beam mode to a low beam mode. In another example, controller 104 may determine to change a mode of the system 100 from a high beam mode to a low beam mode in response to sensor data indicating an oncoming automobile. In any case, in response to determining a mode of system 100, controller 104 may determine a quantity number of load units corresponding to the mode. For instance, controller 104 may determine that the target quantity number of load units 120 used to form the series string of load units is one when the low beam mode is associated with only load unit 120A and controller 104 may determine that the target quantity number of load units 120 used to form the series string of load units is three when the high beam mode is associated with load units 120A-C.

Controller 104 may determine a target voltage based on the target quantity of units. For example, each load unit of load units 120 may be associated with a predetermined voltage. For instance, in response to determining that the series string of load units has a quantity of one (e.g., low beam mode), controller 104 may determine that the target voltage is the predetermined voltage and in response to determining that the series string of load units has a quantity of three (e.g., high beam mode), controller 104 may determine that the target voltage is three times the predetermined voltage.

Controller 104 may output, to a control input of voltage module 106, the indication of the target voltage. For example, controller 104 may output a voltage that corresponding with the target voltage. For example, as the target voltage increases, controller 104 may increase the voltage output, to the control input of voltage module 106, and as the target voltage decreases, controller 104 may decrease the voltage output, to the control input of voltage module 106.

Compensator 114 may receive the indication of the target voltage and output, to a compensation capacitor and to modulator 112, a compensation voltage. For example, compensator 114 may output the compensation voltage based on a difference between a voltage corresponding to a current flowing from voltage module 106 to load module 102 and the indication of the target voltage. More specifically, compensator 114 may output the compensation voltage as the indication of the target voltage minus a voltage proportional to a current flowing from voltage module 106 to load module 102 that is amplified by a gain.

Modulator 112 may output a switching signal to cause power converter 110 to switch in one or more energy storage components according to a voltage of the compensation capacitor. For instance, modulator 112 may compare the compensation voltage with a reference signal (e.g., sawtooth signal) and output a first signal to cause power converter 110 to switch in the energy one or more energy storage components when the voltage of the compensation capacitor is greater than the reference signal. However, since the compensation capacitor has a rate of change of voltage that is limited by current flowing from the compensation capacitor (e.g., $dv/D_t=i/C$), a voltage of the compensation capacitor does not change instantly in response to the compensation voltage. As such, modulator 112 controls power converter 110 with a duty cycle that is different that a desired target duty cycle, thereby resulting in a current output from voltage module 106 that is different than a desired current.

Accordingly, in some techniques, rather than simultaneously switching one or more load units of load units 120 such that the series string of load units has the target quantity of load units and outputting the indication of the target voltage for the target quantity of load units, controller 104 refrains from switching the one or more load units of load units 120 until after an estimated time delay. For example, controller 104 may estimate a time delay for switching one or more load units of load units 120 such that the series string of load units has the target quantity of load units based on one or more of the target voltage, the voltage of the capacitor, and a capacitance of the capacitor. For instance, the time delay (e.g., $T_{wait}$) for switching one or more load units of load units 120 may be calculated as $T_{wait}=C_{comp}*dV_{comp}/i_{ea}$, where $C_{comp}$ is a capacitance of the compensation capacitor, $dV_{comp}$ is a difference between the target voltage and the compensation voltage of the compensation capacitor, and $i_{ea}$ is a current output from compensator 114 into modulator 112.

After controller 104 outputs the indication of the target voltage for the time delay and to a control input of voltage module 106, controller 104 outputs, to load module 102, a control signal to switch one or more load units of load units 120 such that the series string of load units has the target quantity of load units. For instance, in response to outputting, to compensator 114 of voltage module 106, an indication of a target voltage that corresponds to the series string of load units having a quantity of three (e.g., high beam mode) for the time delay, controller 104 may output, to load module 102, a control signal to switch in load units 120A-C. In response to receiving the control signal to switch one or more load units of load units 120 such that the series string of load units has the target quantity of load units, load module 102 switches one or more load units of load units 120 such that the series string of load units has the target quantity of load units. For instance, in response to receiving, from controller 104, the control signal to switch in load units 120A-C, load module switches out switching elements 122B and 122C such that current output from voltage module 106 flows through load units 120A-C.

In this manner, the target quantity of load units may not be switched in until the compensation capacitor has sufficient time to charge or discharge such that the compensation voltage is equal to the target voltage. As such, voltage module 106 may supply a current to load module 102 that is substantially similar to the desired current, thereby resulting in a reduction in current undershoot and/or overshoot compared with systems that do not account for a discharge or charge time of the compensation capacitor.

Figure 2A:
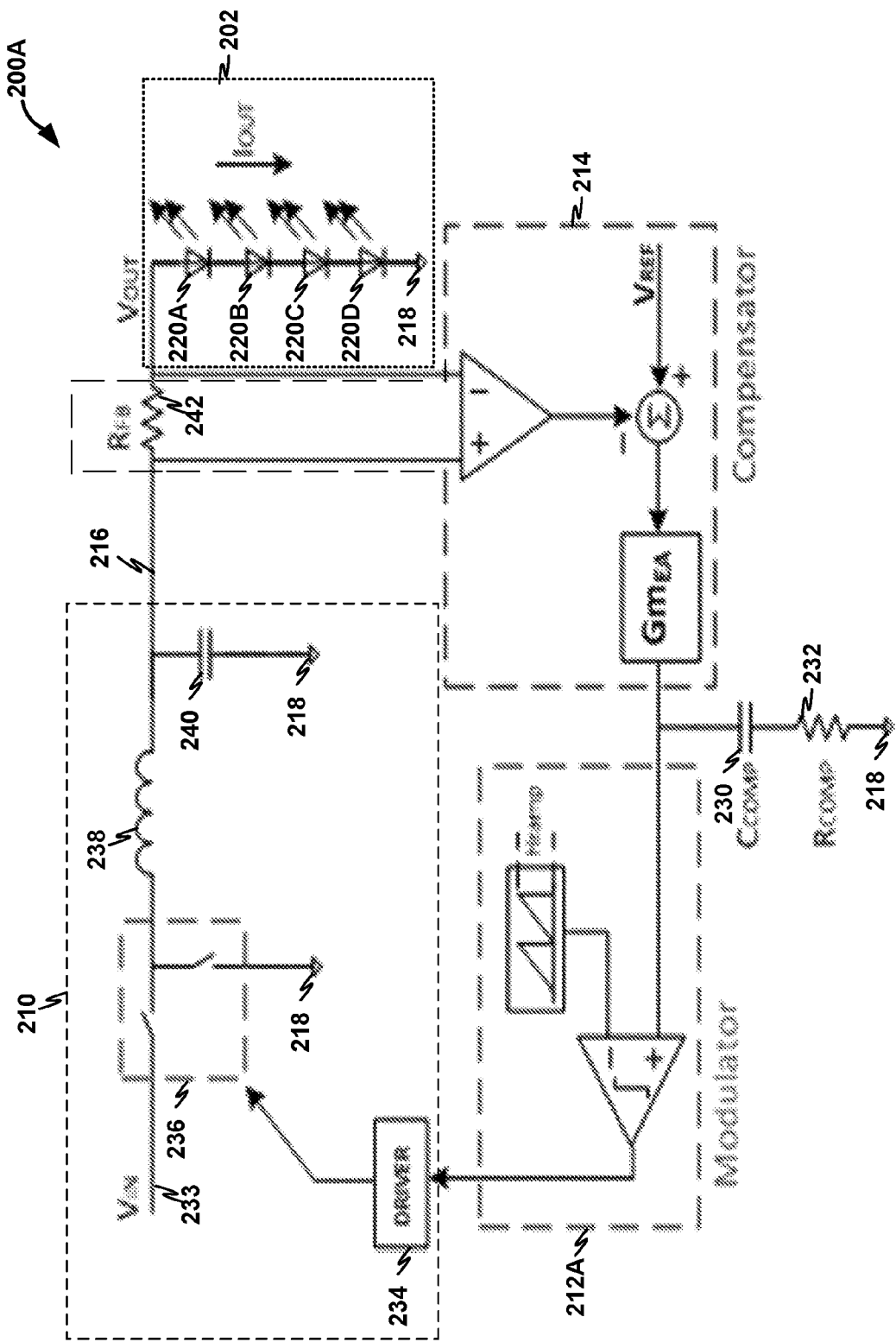
FIG. 2A is a conceptual diagram illustrating an example first circuit of the system of FIG. 1, in accordance with one or more techniques of this disclosure.

FIG. 2A is a conceptual diagram illustrating an example first circuit 200A of the system of FIG. 1, in accordance with one or more techniques of this disclosure. As illustrated, circuit 200A includes load module 202, power converter 210, modulator 212A, compensator 214, voltage rail 216, reference node 218, compensation capacitor 230, and compensation resistive element 232. Load module 202 may be an example of load module 102 of FIG. 1. For example, as shown, load module 202 may include light emitting diode 220A, 220B, 220C, and 220D (collectively "LEDs 220") that may be examples of load units 120. Power converter 210, modulator 212A, compensator 214 may be an example of voltage module 106 of FIG. 1. For instance, power converter 210 may be an example of power converter 110 of FIG. 1, modulator 212A may be an example of modulator 112 of FIG. 1, and compensator 214 may be an example of compensator 114 of FIG. 1.

Compensator 214 may receive the indication of the target voltage and output, to compensation capacitor 230, a compensation voltage. For example, compensator 214 may output the compensation voltage based on a difference between a voltage across resistive element 242 that corresponds to a current flowing from power converter 210 to load unit 202 and the indication of the target voltage (e.g., a $V_{REF}$ from controller 104). More specifically, compensator 214 may output the compensation voltage to compensation capacitor 230 as the indication of the target voltage (e.g., $V_{REF}$ from controller 104)) minus a voltage across resistive element 242 that is amplified by a gain. Compensator 214 may include one or more analog components, for instance, but not limited to, one or more operational amplifiers.

Modulator 212A may output, to power converter 210, a control signal for controlling a voltage and/or current output from power converter 210. For example, modulator 212A may compare the voltage of compensation capacitor 230 with a reference signal (e.g., sawtooth signal) and output, to power converter 210, a switching signal indicating a duty cycle. More specifically, modulator 212A may output the switching signal with a high signal when the voltage of compensation capacitor 230 is greater than the reference signal and output the switching signal with a low signal when the voltage of compensation capacitor 230 is not greater than the reference signal.

Power converter 210 may include a driver 234, switching unit 236, inductor 238, capacitor 240, and voltage source 233. Voltage source 233 may be any suitable device configured to supply electrical power. For example, voltage source 233 may be an energy storage device (e.g., battery), an output of a rectifier, an output of a converter, or another device configured to supply electrical power. As shown, driver 234 may receive, from modulator 212A, the switching signal, and selectively couple inductor 238 and a voltage source 233 according to the switching signal. For example, when the switching signal is low, driver 234 may cause switching unit 236 to couple inductor 238 to reference node 218 and when the switching signal is high, driver 234 may cause switching unit 236 to couple inductor 238 to voltage source 233. In this manner, switching unit 236 is switched to move energy between a magnetic field of inductor 238 and an electric field of capacitor 240 such that a voltage output onto voltage rail 216 is regulated according to the duty cycle output by modulator 212A, which is controlled according to the voltage of compensation capacitor 230.

Accordingly, in some techniques, rather than simultaneously switching LEDs 220 of load module 202, controller 104 may refrain from switching LEDs 220 until after the voltage at compensation capacitor 230 equals to the compensation voltage output by compensator 214. In this manner, power converter 210 may supply a current to LEDs 220 that is substantially similar to the desired current, thereby resulting in a reduction in current undershoot and/or overshoot compared with circuits that do not account for a discharge or charge time of compensation capacitor 230.

Figure 2B:
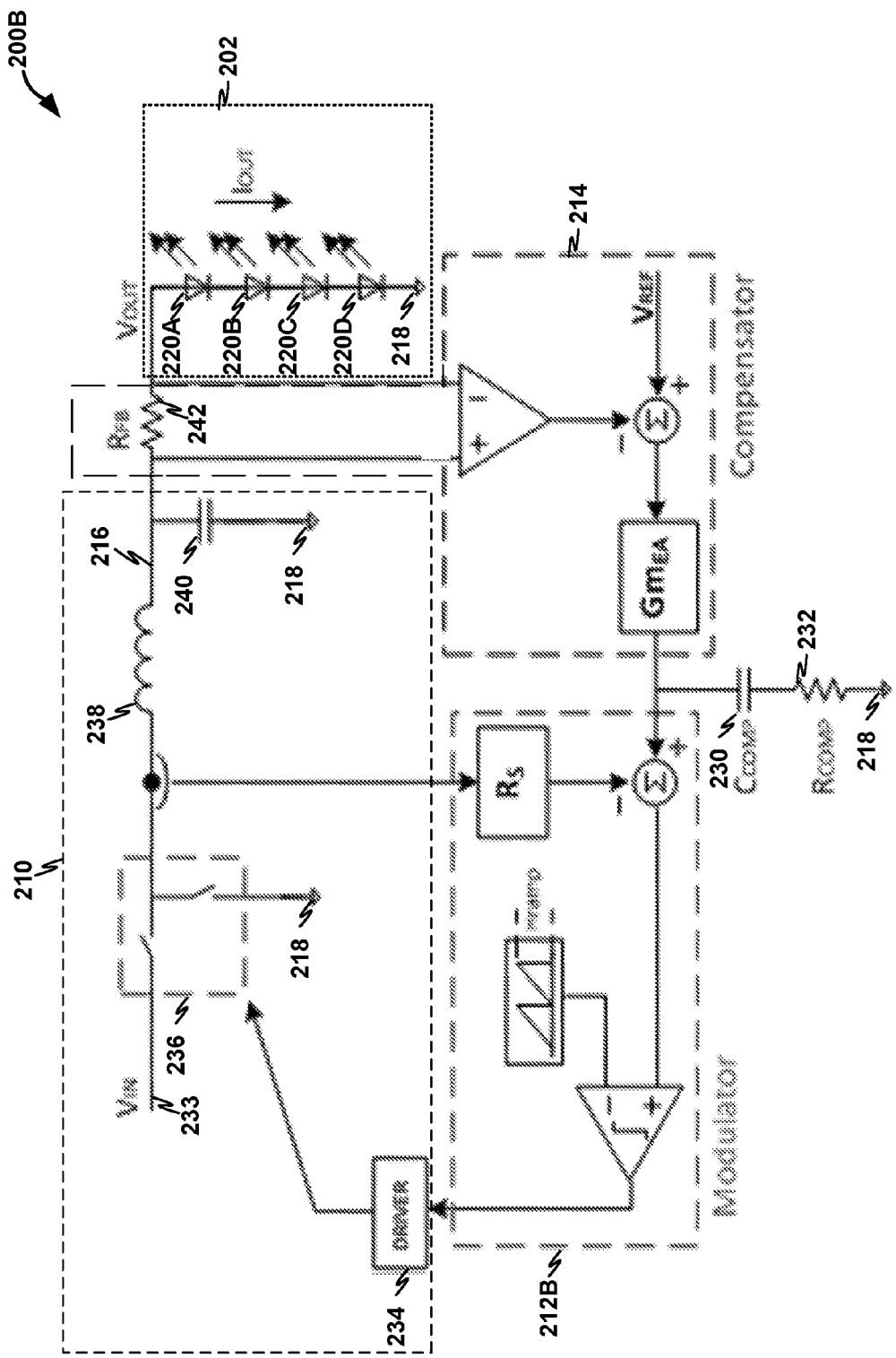
FIG. 2B is a conceptual diagram illustrating an example second circuit of the system of FIG. 1, in accordance with one or more techniques of this disclosure.

FIG. 2B is a conceptual diagram illustrating an example second circuit 200B of the system of FIG. 1, in accordance with one or more techniques of this disclosure. As illustrated circuit 200B includes load module 202, power converter 210, modulator 212B, compensator 214, voltage rail 216, reference node 218, compensation capacitor 230, and compensation resistive element 232. Power converter 210, modulator 212B, compensator 214 may be an example of voltage module 106 of FIG. 1. For instance, power converter 210 may be an example of power converter 110 of FIG. 1, modulator 212B may be an example of modulator 112 of FIG. 1, and compensator 214 may be an example of compensator 114 of FIG. 1.

Similarly to modulator 212A, modulator 212B may output, to power converter 210, a switching signal for controlling a voltage and/or current output from power converter 210. However, modulator 212B may further include a mean current loop, for instance, but not limited, to control a buck converter. More specifically, modulator 212B may modify the voltage of compensation capacitor 230 with a signal that is based on a current flow of inductor 238, and compare the modified voltage of compensation capacitor 230, rather than only the voltage of compensation capacitor 230, with the reference signal (e.g., sawtooth signal) and output, to power converter 210, a switching signal indicating a duty cycle.

Figure 3:
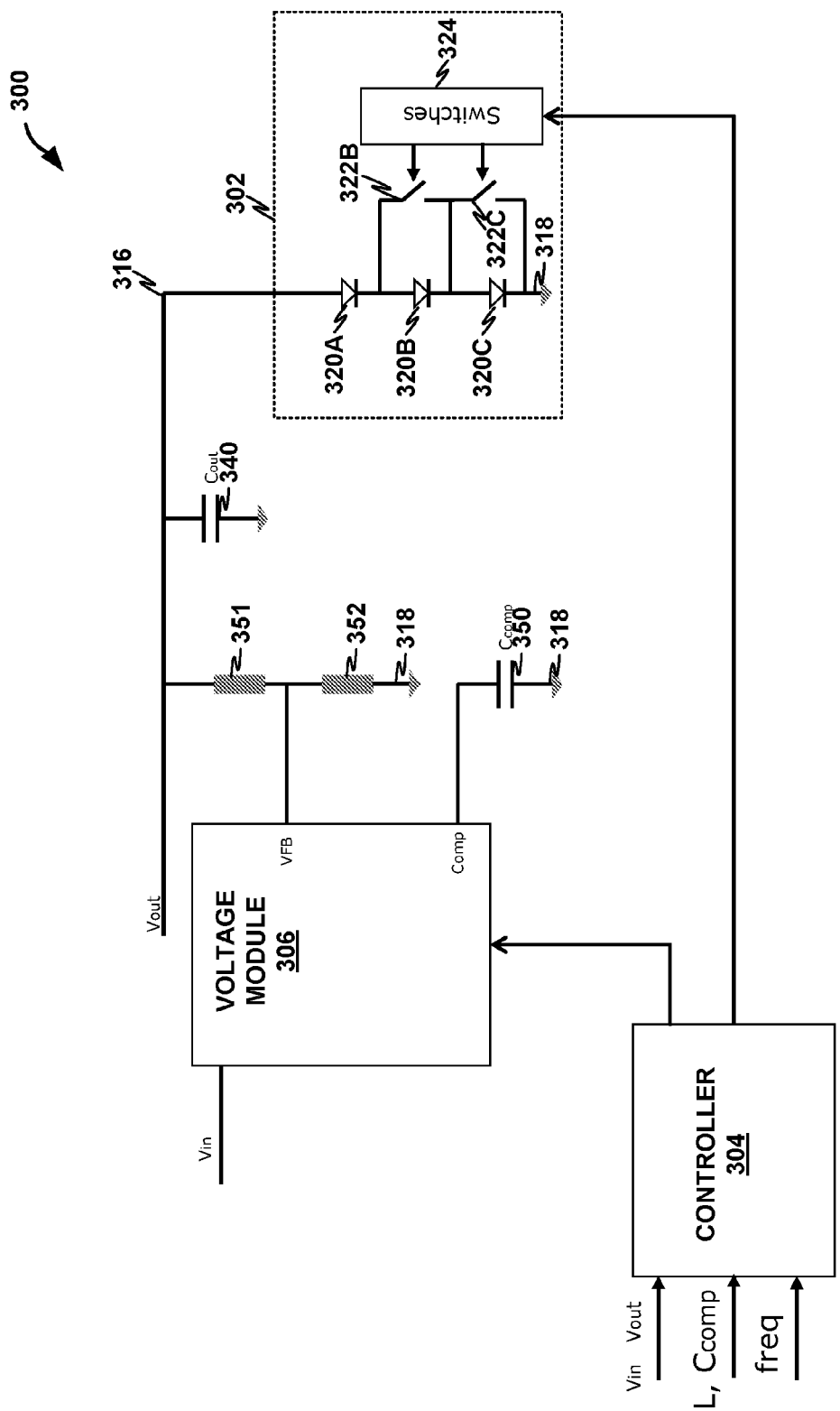
FIG. 3 is a circuit diagram illustrating an example circuit of the system of FIG. 1, in accordance with one or more techniques of this disclosure.

FIG. 3 is a circuit diagram illustrating an example circuit 300 of system 100 of FIG. 1, in accordance with one or more techniques of this disclosure. As illustrated circuit 300 includes load module 302, controller 304, voltage module 306, resistive elements 351 and 352, voltage rail 316, reference rail 318, compensation capacitor 350, and output capacitor 340. Load module 302 may be an example of load module 102 of FIG. 1. For example, load module 302 may include load units 320A-C (collectively "load units 320"), which may be examples of load units 120 of FIG. 1, switching elements 322B and 322C (collectively "switching elements 322), which may be examples of switching elements 122 of FIG. 1, and switching unit 324, which may be an example of multifunctional switching unit 124 of FIG. 1. Voltage module 306 may be an example of voltage module 106 of FIG. 1 and/or an example of voltage module 206 of FIGS. 2A and 2B. For example, voltage module 306 may include any combination of power converter 110, modulator 112, and compensator 114 of FIG. 1, power converter 210, modulator 212A, and compensator 214 of FIG. 2A, and power converter 210, modulator 212B, and compensator 214 of FIG. 2B.

Voltage module 306 may be configured to output a voltage to output capacitor 340 and load module 302 that is based on a voltage of compensation capacitor 350 and a feedback voltage corresponding to the voltage output to load module 302. As shown, the feedback voltage received by voltage module 306 is a voltage of a voltage divider formed by resistive elements 351 and 352. For example, voltage module 306 may buck or boost a voltage received an input (e.g., $V_{in}$) of voltage module 306 according to a duty cycle and output the resulting voltage at an output (e.g., $V_{out}$) of voltage module to output capacitor 340 and to load module 302. In the example, voltage module 306 may determine the duty cycle according to a voltage of compensation capacitor 350 and the voltage of a voltage divider formed by resistive elements 351 and 352.

Voltage module 306 may be configured to control a voltage of compensation capacitor 350. For example, in response to receiving a voltage reference from controller 304, voltage module 306 may charge and/or discharge compensation capacitor 350 according to the voltage reference received from controller 304. In this manner, voltage module 306 may change the resulting voltage at an output (e.g., $V_{out}$) of voltage module to output capacitor 340 and load module 302 to a desired voltage.

Rather than simultaneously changing the voltage reference to accommodate a target quantity of load units 320 and switching one or more load units of load units 320 such that a series string of load units 320 has the target quantity, controller 304 refrains from switching one or more load units of load units 320 until after a time delay. For example, controller 304 may estimate the time delay based on any combination of the input voltage received at an input of (e.g., $V_{in}$) of voltage module 306, an output voltage output, at an output (e.g., $V_{out}$) of voltage module 306, an inductance of an inductor of voltage module 306 (e.g., inductor 238 of power converter 210 of FIGS. 2A and 2B), a capacitance of compensation capacitor 350, and a frequency used to switch one or more energy storage elements of voltage module 306 (e.g., inductor 238 and capacitor 240 of power converter 210 of FIGS. 2A and 2B). For instance, controller 304 may calculate the time delay (e.g., $T_{wait}$) as $T_{wait}=C_{comp}*dV_{comp}/i_{ea}$, where $C_{comp}$ is a capacitance of compensation capacitor 350, $dV_{comp}$ is a difference between a target voltage for the target number of load units 320 and the voltage of compensation capacitor 350, and $i_{ea}$ is a current output from compensation capacitor 350 into voltage module 306.

After controller 304 outputs the indication of the target voltage for the time delay, controller 304 outputs, to load module 302, a control signal to switch one or more load units of load units 320 such that the series string of load units has the target quantity of load units. In this manner, the target quantity of load units may not be switched in until compensation capacitor 350 has sufficient time to charge or discharge such that the compensation voltage is stable. As such, voltage module 306 may supply a current to load module 302 that is substantially similar to the desired current, thereby resulting in a reduction in current undershoot and/or overshoot compared with circuits that do not account for a discharge or charge time of compensation capacitor 350.

Figure 4:
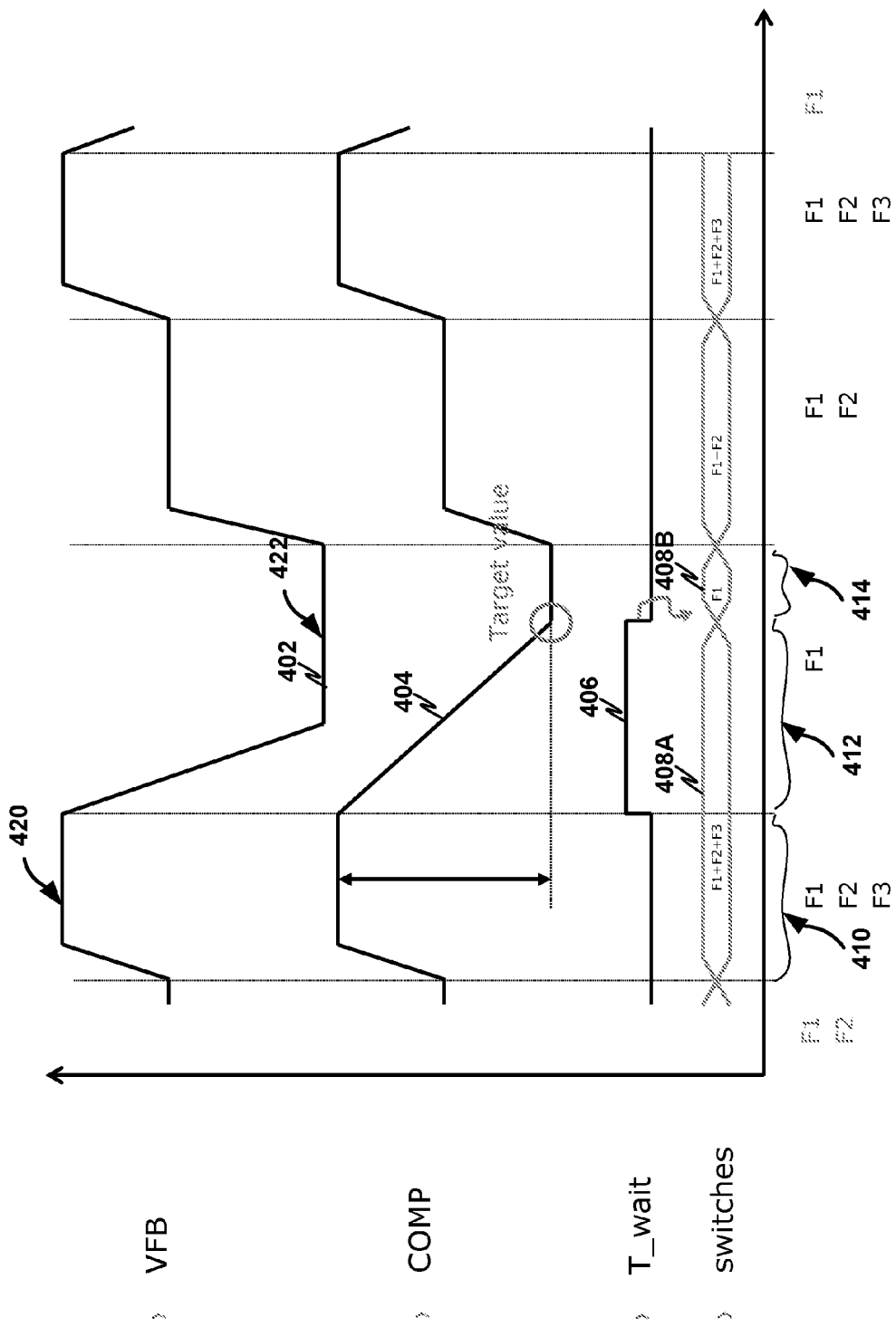
FIG. 4 is a diagram illustrating an example performance of the system of FIG. 1, in accordance with one or more techniques of this disclosure.

FIG. 4 is a diagram illustrating an example performance of system 100 of FIG. 1, in accordance with one or more techniques of this disclosure. For purposes of illustration only, FIG. 4 is described below within the context of circuit 300 of FIG. 3. However, the techniques described below can be used in any permutation, and in any combination, with load module 102, controller 104, voltage module 106, voltage rail 116, and reference node 118 of FIG. 1.

In the example of FIG. 4, controller 304 initially, at state 410, outputs a reference voltage to voltage module 306 to cause voltage module 306 to output a voltage for three of load units 320 (e.g., load units 320A-C). As shown, in state 410, controller 304 outputs, to load module 302, switching signal 408A that switches in three of load units 320 (e.g., load units 320A-C). Accordingly, voltage module 306 outputs a voltage to load module 302 such that a feedback voltage (e.g., $V_{FB}$) 402 received, by voltage module 306, from the voltage of a voltage divider formed by resistive elements 351 and 352, is at a high voltage level 420.

At state 412, controller 304 outputs a reference voltage to voltage module 306 to cause voltage module 306 to output a voltage for one of load units 320 (e.g., load unit 320A, load unit 320B, or load unit 320C). However, rather than simultaneously changing both the voltage reference and switching the load units of load module 302, during state 412, controller 304 refrains from switching one or more load units of load units 320 until after a time delay 406. Accordingly, in state 412, controller 304 continues to output, to load module 302, switching signal 408A that switches in three of load units 320 (e.g., load units 320A-C). As shown, voltage 404 of compensation capacitor 350 stabilizes to match a desired voltage for switching in one of load units 320 during state 412 and feedback voltage (e.g., $V_{FB}$) 402 received, by voltage module 306, transitions from the high voltage level 420 to a low voltage level 422.

At state 414, time delay 406 has elapsed, and controller 304 outputs, to load module 302, switching signal 408B that switches in one of load units 320 (e.g., load unit 320A, load unit 320B, or load unit 320C). Since voltage 404 of compensation capacitor 350 has stabilized to match a desired voltage for switching in one of load units 320 during state 412 and feedback voltage (e.g., $V_{FB}$) 402 received, by voltage module 306, has transitioned from the high voltage level 420 to the low voltage level 422, voltage module 306 outputs a voltage to load module 302 that has minimal overshoot and undershoot. For example, as shown, feedback voltage (e.g., $V_{FB}$) 402 received, by voltage module 306, has a low voltage level 422 with minimal overshoot and undershoot.

Figure 5:
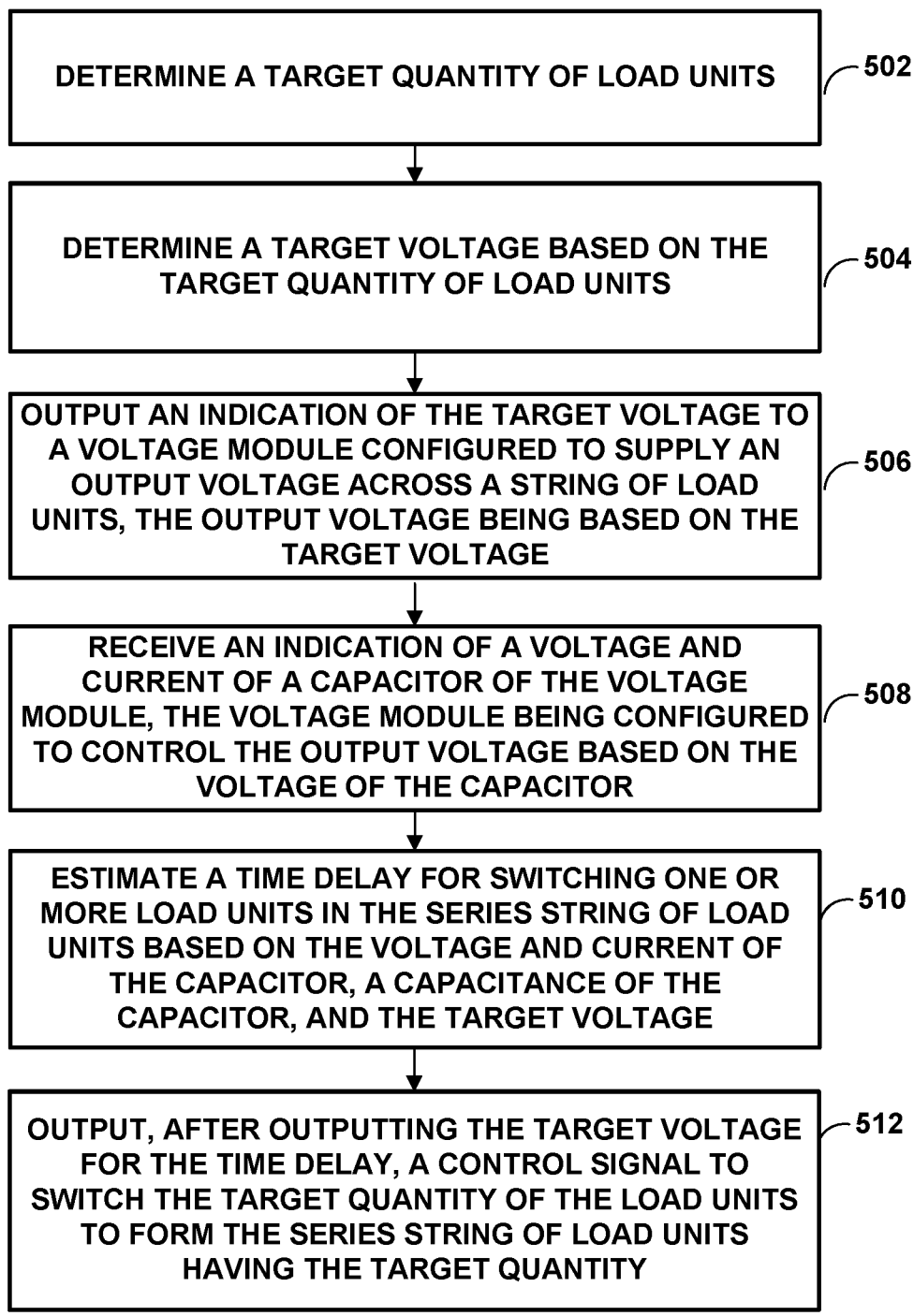
FIG. 5 is a flow diagram consistent with techniques that may be performed by the system of FIG. 1, in accordance with this disclosure.

FIG. 5 is a flow diagram consistent with techniques that may be performed by the system of FIG. 1, in accordance with this disclosure. For purposes of illustration only, FIG. 5 is described below within the context of system 100 of FIG. 1 and circuit 300 of FIG. 3. However, the techniques described below can be used in any permutation, and in any combination, with load module 102, controller 104, voltage module 106, voltage rail 116, and reference node 118 of FIG. 1.

In accordance with one or more techniques of this disclosure, controller 104 determines a target quantity of load units (502). For example, controller 104 detects an oncoming automobile and determines to reduce the target quantity of load units to correspond with a low beam mode of load module 102. Controller 104 determines a target voltage based on the target quantity of load units (504). For example, controller 104 multiplies the target quantity of load units by a predetermined voltage associated with load units 120. Controller 104 outputs an indication of the target voltage to a voltage module configured to supply an output voltage across a string of load units, the output voltage being based on the target voltage (506). For example, controller 104 outputs a voltage reference indicating the target voltage to compensator 114 of voltage module 106.

Controller 104 receives an indication of a voltage and current of a capacitor of the voltage module, the voltage module being configured to control the output voltage based on the voltage of the capacitor (508). For example, controller 104 receives a voltage and current of compensation capacitor 350. Controller 104 estimates a time delay for switching one or more load units in the series string of load units based on the voltage and current of the capacitor, a capacitance of the capacitor, and the target voltage (510). For example, controller estimates the time delay (e.g., $T_{wait}$) as $T_{wait}=C_{comp}*dV_{comp}/i_{ea}$, where Comp is a capacitance of compensation capacitor 350, $dV_{comp}$ is a difference between a target voltage for the target number of load units 120 and the voltage of compensation capacitor 350, and $i_{ea}$ is a current output from compensation capacitor 350 into voltage module 306.

Controller 104 outputs, after outputting the target voltage for the time delay, a control signal to switch the target quantity of the load units to form the series string of load units having the target quantity (512). For example, controller 104 outputs, to load module 102, a control signal to switch in load unit 120A and to switch out load units 120B and 120C to correspond with the low beam mode of load module 102.

Figure 6:
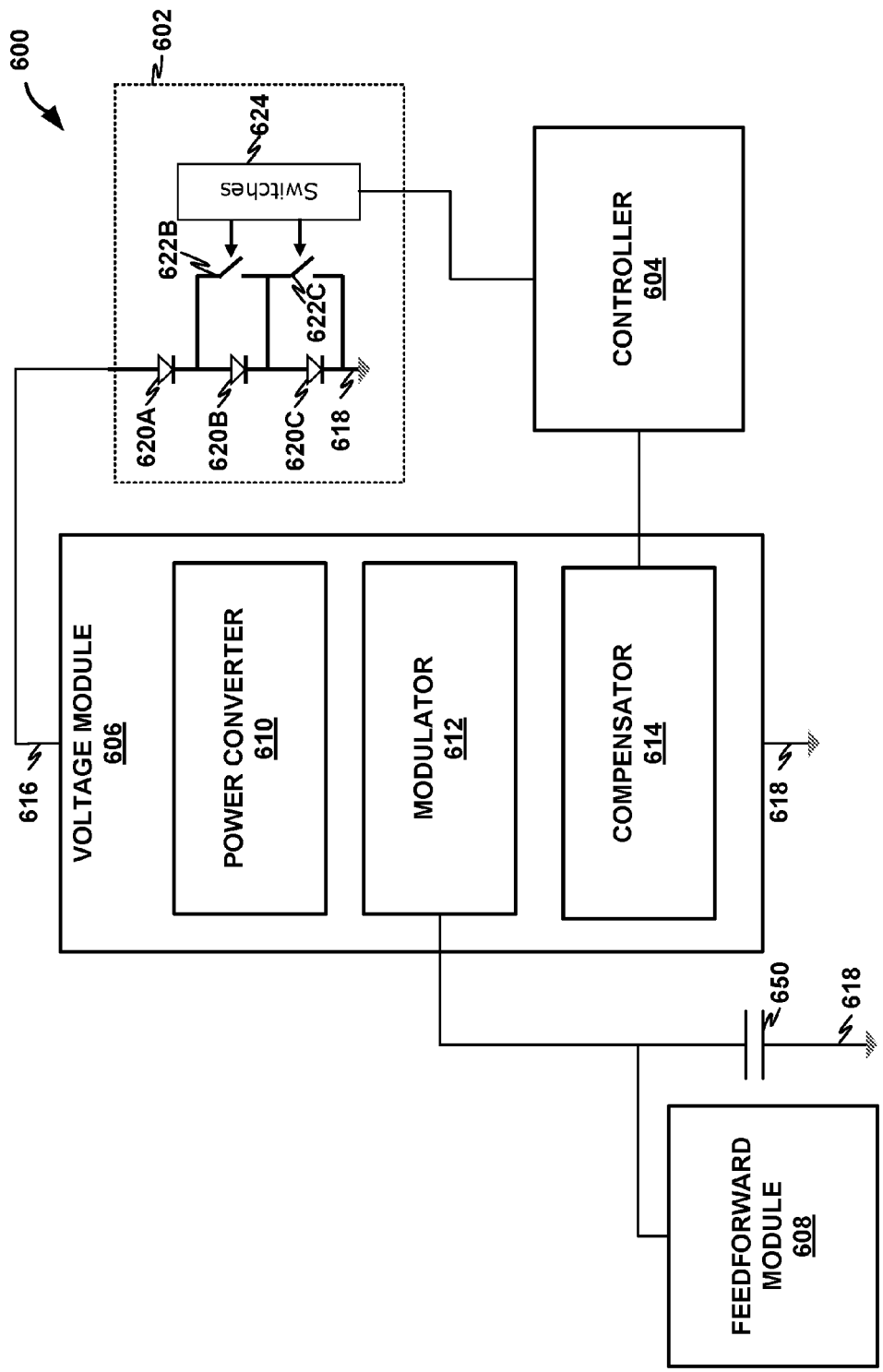
FIG. 6 is a conceptual block diagram illustrating an example system configured to modify an energy level of a capacitor for switching load units, in accordance with one or more techniques of this disclosure.

FIG. 6 is a conceptual block diagram illustrating an example system 600 configured to modify an energy level of a capacitor for switching load units, in accordance with one or more techniques of this disclosure. As illustrated system 600 includes load module 602, controller 604, voltage module 606, feedforward module 608, voltage rail 616, ground rail 618, and compensation capacitor 650. Load module 602 may be an example of load module 102 of FIG. 1. For example, load module 602 may include load units 620A-C (collectively "load units 620"), which may be examples of load units 120 of FIG. 1, switching elements 622B and 622C (collectively "switching elements 622"), which may be examples of switching elements 122 of FIG. 1, and switching unit 624, which may be an example of multifunctional switching unit 124 of FIG. 1. Voltage module 606 may be an example of voltage module 106 of FIG. 1 and/or an example of voltage module 206 of FIGS. 2A and 2B. For example, voltage module 606 may include power converter 610, which may be an example of power converter 110 of FIG. 1, modulator 612, which may be an example of modulator 112 of FIG. 1, and compensator 614, which may be an example of compensator 114 of FIG. 1.

Rather than charging and discharging compensation capacitor 650 using voltage module 606, feedforward module 608 may be configured to force compensation capacitor 650 to a desired voltage. For example, feedforward module 608 may output a voltage with a higher current higher to more quickly force compensation capacitor 650 to the target voltage when a current voltage of compensation capacitor 650 is less than the target voltage. Feedforward module 608 may include analog components. For example, feedforward module 608 may include one or more operational amplifiers.

In accordance with one or more techniques, feedforward module 608 may receive an indication of a current quantity of load units 620 used to form a series string of load units 620 and receive an indication of a target quantity of load units 620 used to form the series string of load units 620. For example, feedforward module 608 may receive a signal indicating that the current quantity of load units 620 is three and that the target quantity of load units 620 is one.

Feedforward module 608 may detect a voltage of compensation capacitor 650. For example, feedforward module 608 may sample a voltage at compensation capacitor 650. Feedforward module 608 may output a target voltage for the capacitor that is based on the current quantity, the target quantity, and the voltage of the capacitor. For example, feedforward module 608 may output a voltage to compensation capacitor 650 that is proportional to the voltage of compensation capacitor 650 modified by a difference between the current quantity of load units 620 and the target quantity of load units 620. More specifically, feedforward module 608 may output a voltage to compensation capacitor 350 that increases in magnitude as a difference in the current quantity of load units 620 and the target quantity of load units 620 increases and decreases in magnitude as a difference in the current quantity of load units 620 and the target quantity of load units 620 decreases. In examples where a current control loop is used (e.g., FIG. 2B), an offset may be added to account for the mean current control. In this manner, feedforward module 608 may force the voltage of compensation capacitor 650 to the target voltage. As such, voltage module 606 may supply a current to load module 602 that is substantially similar to the desired current, thereby resulting in a reduction in current undershoot and/or overshoot compared with systems that do not account for a discharge or charge time of compensation capacitor 650.

Figure 7A:
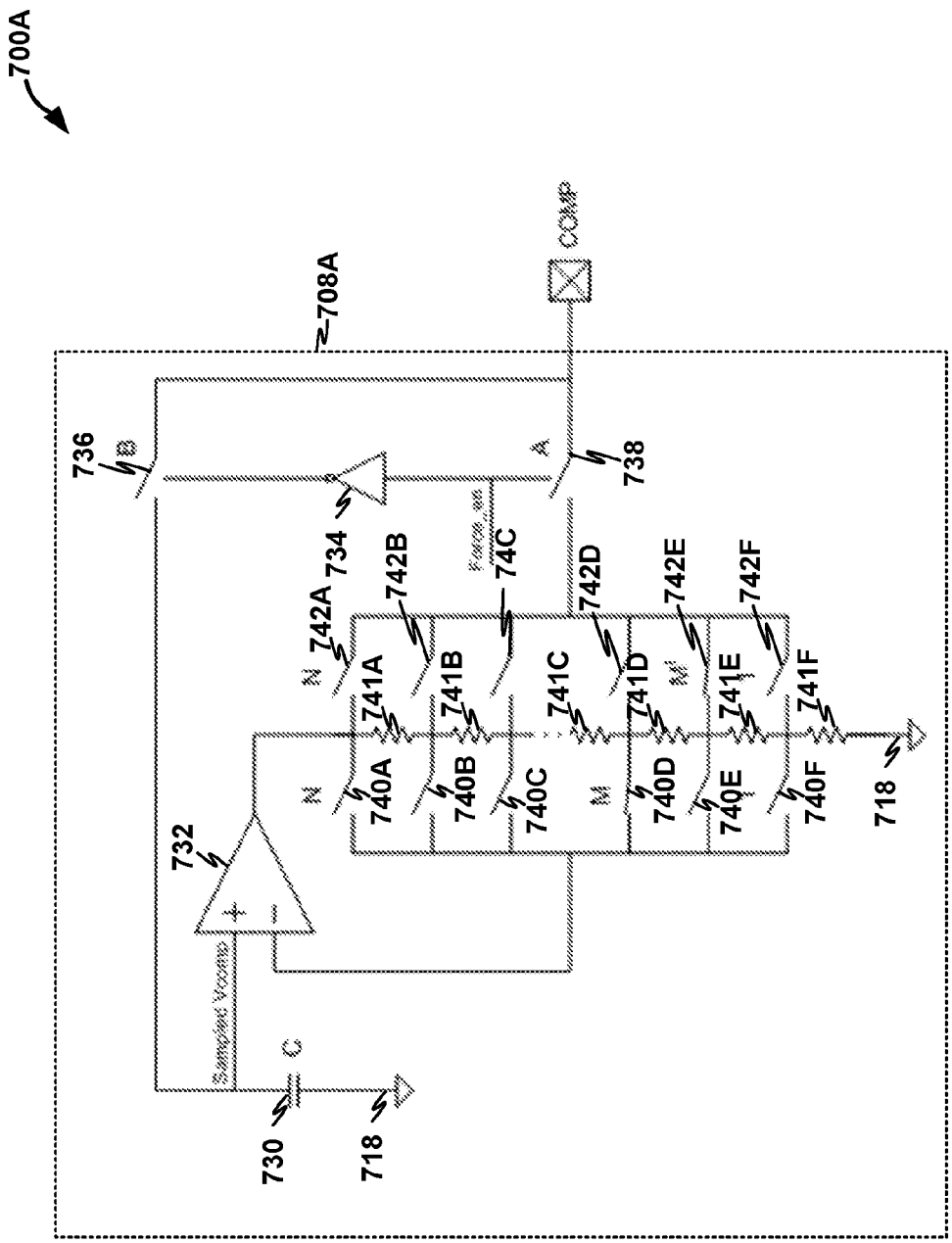
FIG. 7A is a circuit diagram illustrating an example first circuit of the system of FIG. 6, in accordance with one or more techniques of this disclosure.

FIG. 7A is a circuit diagram illustrating an example first circuit 700A of system 600 of FIG. 6, in accordance with one or more techniques of this disclosure. As illustrated circuit 700 includes feedforward module 708A which may be an example of feedforward module 608 of FIG. 6. For purposes of illustration only, FIG. 7A is described below within the context of system 600 of FIG. 6. However, the techniques described below can be used in any permutation, and in any combination, with includes load module 602, controller 604, voltage module 606, feedforward module 608, voltage rail 616, ground rail 618, and compensation capacitor 650 of FIG. 6.

Feedforward module 708 includes capacitor 730 coupled to reference node 718 (e.g., ground), operational amplifier 732, inverter (e.g., a logical inverter) 734, switching elements 736 and 738, first switching elements 740A-F (collectively "first switching elements 740"), resistive elements 741A-F (collectively "resistive elements 741"), and second switching elements 742A-F (collectively "second switching elements 742"). Examples of switching elements 736, 738, 740, and 742 may include, but are not limited to, silicon controlled rectifier (SCR), a Field Effect Transistor (FET), and bipolar junction transistor (BJT). In some examples, resistive elements 741 may be sized to have identical resistance values. Additionally, although feedforward module 708 is configured to support a chain of up to six load units (e.g., 620), feedforward module 708 may be configured to support any suitable number of load units, for instance, by including additional first switching elements 740, second switching elements 742, and resistive elements 741.

First switching elements 740 may be configured to selectively couple a second input of operation amplifier 732 to a resistive element of resistive elements 741 corresponding to the current quantity of load units. Additionally, second switching elements 742 may be configured to selectively couple an output of second switching elements 742 to a resistive element of resistive elements 741 corresponding to the target quantity of load units. For example, when switching from a high beam mode corresponding with three load units to a low beam mode corresponding with one load unit, first switching element 740C couples the second input (e.g., negative) of operation amplifier 732 to resistive element 741C and first switching elements 740A-B and 740D-F are switched out, which corresponds with three load units, and second switching element 742A couples the output of second switching elements 742 to resistive element 741A and second switching elements 742B-F are switched out, which corresponds with one load unit.

In accordance with one or more techniques, feedforward module 708A may receive (e.g., from controller 604 of FIG. 6) a signal indicating a current quantity of load units (e.g., 620) that switches in one of first switching elements 740 and a signal indicating a target quantity of load units (e.g., 620) that switches in one of second switching elements 742. For example, when switching from a high beam mode corresponding with three load units to a low beam mode corresponding with one load unit, feedforward module 708A may receive (e.g., from controller 604 of FIG. 6) a signal indicating a current quantity of load units (e.g., 620) that switches in first switching element 740C and a signal indicating a target quantity of load units (e.g., 620) that switches in second switching element 742A.

Feedforward module 708A may detect a voltage of the compensation capacitor. For example, feedforward module 708A may sample a voltage at the compensation capacitor by receiving, at a force enable input (e.g., "Force_en"), from controller 604, a signal having a logical value (e.g., a low signal) that switches in switching element 736 and switches, via inverter 734, out switching element 738. In the example, operating switching element 736 in a closed state (e.g., switched in) permits compensation capacitor 650 to charge capacitor 730 to match a voltage of compensation capacitor 650.

Feedforward module 708A may output a target voltage to force the compensation capacitor (e.g., 650) to a target voltage level. For example, switching elements 736 and 738 charge and/or discharge capacitor 730 to a voltage that is substantially equal to a voltage of the compensation capacitor. In the example, switching elements 740 and 742 may electronically couple operation amplifier 732 such that a switching state of first switching elements 740 correspond to the current quantity of load units, and a switching state of second switching elements 742 correspond to the target quantity of load units. In this manner, feedforward module 708A outputs the target voltage based on the current quantity, the target quantity, and the voltage of the compensation capacitor. For example, when switching from a high beam mode corresponding with three load units to a low beam mode corresponding with one load unit, feedforward module 708A switch in only first switching element 740C and only second switching element 742A.

Feedforward module 708A may modify, using the output, an energy level of the compensation capacitor such that the voltage of the capacitor corresponds to the target voltage. For example, feedforward module 708A may receive, at the force enable input (e.g., "Force_en"), from controller 604, a signal having a logical value (e.g., a high signal) that switches in switching element 738 and switches out switching element 736. In the example, operating switching element 738 in a closed state forces the voltage of the compensation capacitor to match the target voltage output by feedforward module 708A. In this manner, the voltage of the compensation capacitor may be forced by the feedforward module 708A to the target voltage. As such, a voltage module (e.g., 606) may supply a current to a load module (e.g., 602) that is substantially similar to the desired current, thereby resulting in minimal current undershoot and/or overshoot compared with circuits that do not account for a discharge or charge time of the compensation capacitor.

Figure 7B:
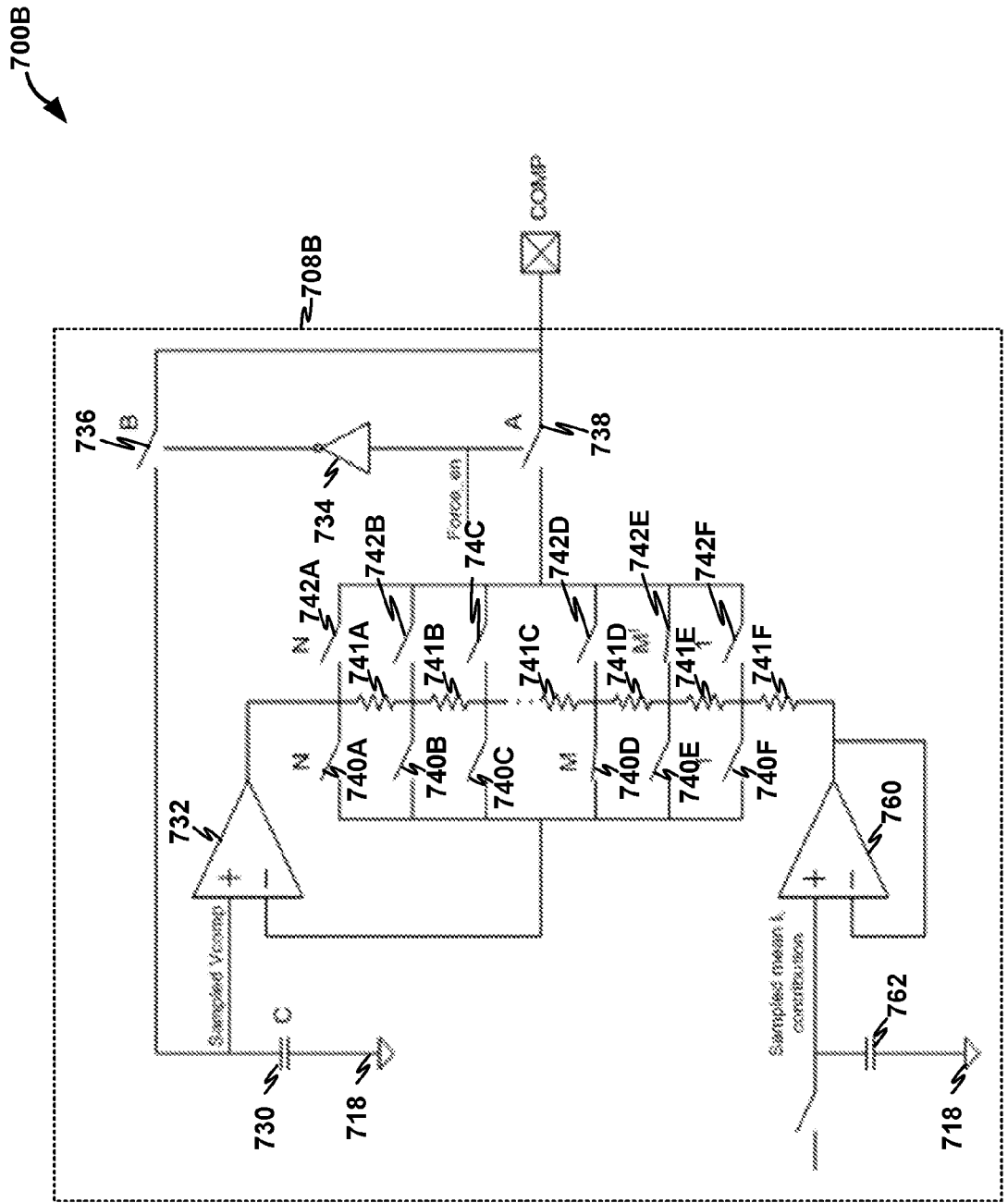
FIG. 7B is a circuit diagram illustrating an example second circuit of the system of FIG. 6, in accordance with one or more techniques of this disclosure.

FIG. 7B is a circuit diagram illustrating an example second circuit of the system of FIG. 6, in accordance with one or more techniques of this disclosure. As illustrated circuit 700B includes feedforward module 708B which may be an example of feedforward module 608 of FIG. 6. For purposes of illustration only, FIG. 7B is described below within the context of system 600 of FIG. 6. However, the techniques described below can be used in any permutation, and in any combination, with includes load module 602, controller 604, voltage module 606, feedforward module 608, voltage rail 616, ground rail 618, and compensation capacitor 650 of FIG. 6.

Similarly to feedforward module 708A of FIG. 7A, feedforward module 708B may output a target voltage to force the compensation capacitor (e.g., 650) to a target voltage. However, feedforward module 708B may further include operation amplifier 760 and capacitor 762. As shown, operation amplifier 760 includes a first terminal (e.g., positive) coupled to capacitor 762 and to an output of a sampled mean current contribution and a second terminal (e.g. negative) coupled to an output of operation amplifier 760. In this manner, feedforward module 708B may modify the target voltage to account for the mean current contribution. More specifically, feedforward module 708B may add, to the output, an offset voltage indicating the mean current contribution of a voltage module (e.g., 606).

Figure 8:
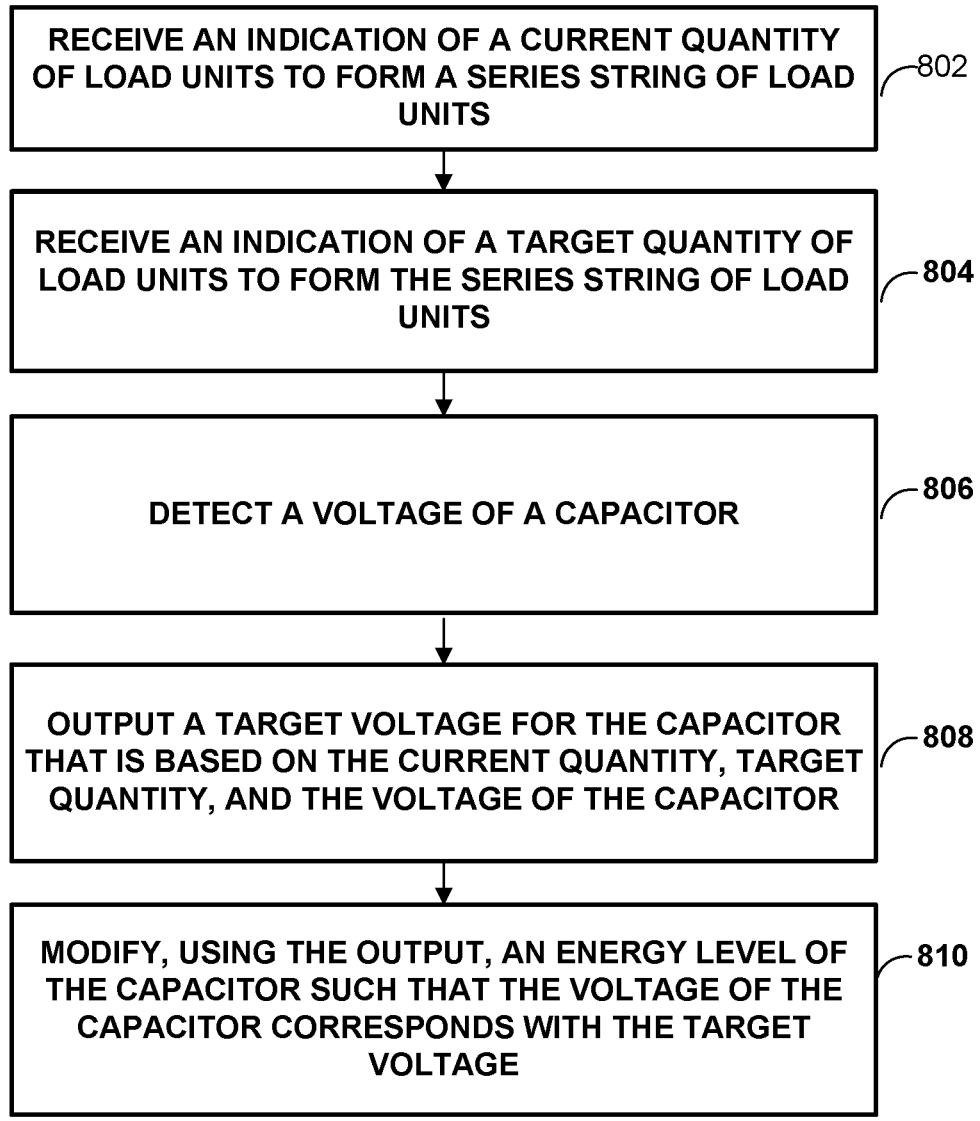
FIG. 8 is a flow diagram consistent with techniques that may be performed by the example system of FIG. 6, in accordance with this disclosure.

FIG. 8 is a flow diagram consistent with techniques that may be performed by example system 600 of FIG. 6, in accordance with this disclosure. For purposes of illustration only, FIG. 8 is described below within the context of system 600 of FIG. 6, circuit 700A of FIG. 7A, and circuit 700B of FIG. 7B. However, the techniques described below can be used in any permutation, and in any combination, with load module 602, controller 604, voltage module 606, voltage rail 616, feedforward module 608, ground rail 618, and compensation capacitor 650 of FIG. 6.

In accordance with one or more techniques of this disclosure, feedforward module 608 receives an indication of a current quantity of load units to form a series string of load units (802). For example, feedforward module 608 receives, from controller 604, an indication that system 600 is transitioning from a high beam mode corresponding to a current quantity of three load units. Feedforward module 608 receives an indication of a target quantity of load units to form the series string of load units (804). For example, feedforward module 608 receives, from controller 604, an indication that system 600 is transitioning to a low beam mode corresponding to a current quantity of one load unit. Feedforward module 608 detects a voltage of a capacitor (806). For example, controller 604 may output to a force enable input (e.g., "Force_en") of feedforward module 708A of FIG. 7A or feedforward module 708B of FIG. 7B a signal having a logical value (e.g., a low signal) that switches in switching element 736 and switches out switching element 738.

Feedforward module 608 outputs, a target voltage for the capacitor that is based on the current quantity, target quantity, and the voltage of the capacitor (808). For example, switching elements 740 and 742 of FIGS. 7A and 7B may electronically couple operation amplifier 732 of FIGS. 7A and 7B such that a switching state of first switching elements 740 of FIGS. 7A and 7B correspond to the current quantity of three load units, and a switching state of second switching elements 742 of FIGS. 7A and 7B correspond to the target quantity of one load unit.

Feedforward module 608 modifies, using the output, an energy level of the capacitor such that the voltage of the capacitor corresponds to the target voltage (810). For example, controller 604 may output to a force enable input (e.g., "Force_en") of feedforward module 708A of FIG. 7A or feedforward module 708B of FIG. 7B a signal having a logical value (e.g., a high signal) that switches in switching element 738 of FIGS. 7A and 7B and switches out switching element 736 of FIGS. 7A and 7B. In the example, operating switching element 738 of FIGS. 7A and 7B in a closed state forces the voltage of the compensation capacitor to match the target voltage.

The following examples may illustrate one or more aspects of the disclosure.

Example 1

A system comprising: a load module configured to selectively bypass each load unit of a plurality of load units to form a series string of load units; a voltage module configured to receive, at a control input of the voltage module, an indication of a target voltage and supply an output voltage across the series string of load units that is based on the target voltage; and a controller configured to: determine a target quantity of load units used to form the series string of load units, the target quantity of load units being different from a current quantity of load units used to form the series string of load units; determine the target voltage based on the target quantity of load units; output, to the control input of the voltage module, the indication of the target voltage; estimate a time delay for switching one or more load units of the plurality of load units such that the series string of load units has the target quantity of load units; and output, after outputting the indication of the target voltage for the time delay and to the load module, a control signal to switch one or more load units of the plurality of load units such that the series string of load units has the target quantity of load units.

Example 2

The system of example 1, wherein the controller is further configured to: estimate the time delay for switching one or more load units of the plurality of load units such that the series string of load units has the target quantity of load units based on the target voltage.

Example 3

The system of any combination of examples 1-2, further comprising: a capacitor, wherein the voltage module comprises: a compensator configured to supply energy to the capacitor based on the indication of the target voltage; and a modulator configured to control the output voltage across the series string of load units based on a voltage of the capacitor.

Example 4

The system of any combination of examples 1-3, wherein the controller is further configured to: receive an indication of the voltage of the capacitor; and estimate the time delay for switching one or more load units of the plurality of load units in the series string of load units based further on the voltage of the capacitor and a capacitance of the capacitor.

Example 5

The system of any combination of examples 1-4, wherein: the modulator is configured to control the output voltage across the series string of load units based on the voltage of the capacitor by outputting a switching signal indicating a duty cycle that is based on the voltage of the capacitor, and the voltage module further comprises: one or more energy storage elements; and a switching unit configured to selectively switch the one or more energy storage elements using the switching signal.

Example 6

The system of any combination of examples 1-5, wherein: the plurality of load units is a plurality of light emitting diodes; the target quantity of load units is a target quantity of light emitting diodes; the series string of load units is a series string of light emitting diodes; and determining the target quantity of load units used to form the series string of load units comprises: in response to determining that a headlight mode of the system corresponds to a high beam mode, determining the target quantity of light emitting diodes according to a quantity of light emitting diodes associated with the high beam mode; and in response to determining that a headlight mode of the system corresponds to a low beam mode, determining the target quantity of light emitting diodes according to a quantity of light emitting diodes associated with the low beam mode.

Example 7

A method comprising: determining, by a processor, a target quantity of load units used to form the series string of load units, the target quantity of load units being different from a current quantity of load units used to form the series string of load units; determining, by the processor, a target voltage based on the target quantity of load units; outputting, by the processor and to a voltage module configured to supply an output voltage across the string of load units that is based on the target voltage, an indication of the target voltage; estimating, by the processor, a time delay for switching one or more load units such that the series string of load units has the target quantity of load units; and outputting, by the processor and to the load module, after outputting the indication of the target voltage for the time delay, a control signal to switch one or more load units such that the series string of load units has the target quantity of load units.

Example 8

The method of example 7, further comprising: estimating, by the processor, the time delay for switching one or more load units such that the series string of load units has the target quantity of load units based on the target voltage.

Example 9

The method of any combination of examples 7-8, further comprising: receiving, by the processor, an indication of a voltage of a capacitor, the voltage module being configured to control the output voltage across the series string of load units based on the voltage of the capacitor, wherein the estimating of the time delay for switching one or more load units such that the series string of load units has the target quantity of load units is further based on the voltage of the capacitor.

Example 10

The method of any combination of examples 7-9, wherein the estimating of the time delay for switching one or more load units such that the series string of load units has the target quantity of load units is further based on a capacitance of the capacitor.

Example 11

The method of any combination of examples 7-10, further comprising: determining, by the processor, an indication of a current flowing from the capacitor, wherein the estimating of the time delay for switching one or more load units such that the series string of load units has the target quantity of load units is further based on the current flowing from the capacitor.

Example 12

The method of any combination of examples 7-11, further comprising: determining, by the processor, a difference between the target voltage and the voltage of the capacitor, wherein the estimating of the time delay for switching one or more load units such that the series string of load units has the target quantity of load units is further based on the difference between the target voltage and the voltage of the capacitor.

Example 13

The method of any combination of examples 7-12, further comprising: outputting, by the processor, after outputting the indication of the target voltage and before outputting the control signal to switch one or more load units such that the series string of load units has the target quantity of load units, a control signal to switch one or more load units such that the series string of load units has the current quantity of load units.

Example 14

A circuit comprising: a load module configured to selectively bypass each load unit of a plurality of load units to form a series string of load units; a voltage module configured to supply an output voltage across the series string of load units that is based on a voltage of a capacitor; and a feedforward module configured to: receive an indication of a current quantity of load units used to form the series string of load units; receive an indication of a target quantity of load units used to form the series string of load units, the target quantity of load units being different from the current quantity of load units of the series string of load units; detect the voltage of the capacitor; output a target voltage for the capacitor that is based on the current quantity, the target quantity, and the voltage of the capacitor; and modify, using the output, an energy level of the capacitor such that the voltage of the capacitor corresponds to the target voltage.

Example 15

The circuit of example 14, wherein the feedforward module comprises: a plurality of resistive elements coupled in series to form a series string of resistive elements; an operational amplifier including a first input, a second input, and an output, the output of the operational amplifier being coupled to the series string of resistive elements; a first set of switching elements configured to selectively couple the second input of the operation amplifier to a resistive element of the resistive elements corresponding to the current quantity of load units; and a second set of switching elements configured to selectively couple an output of the second set of switching elements to a resistive element of the resistive elements corresponding to the target quantity of load units.

Example 16

The circuit of any combination of examples 14-15, wherein the feedforward module further comprises: a first switching element configured to selectively couple the first input of the operation amplifier to the capacitor.

Example 17

The circuit of any combination of examples 14-16, wherein the feedforward module further comprises: a second switching element configured to selectively couple the output of the second set of switches to the capacitor.

Example 18

The circuit of any combination of examples 14-17, wherein the feedforward module is further configured to: add, to the output, an offset voltage indicating a mean current of the voltage module.

Example 19

The circuit of any combination of examples 14-18, wherein the voltage module comprises: a modulator configured to control the output voltage across the series string of load units based on the voltage of the capacitor by outputting a switching signal indicating a duty cycle that is based on the voltage of the capacitor; one or more energy storage elements; and a switching unit configured to selectively switch the one or more energy storage elements using the switching signal.

Example 20

The circuit of any combination of examples 14-19, wherein the plurality of load units is a plurality of light emitting diodes, the current quantity of load units is a current quantity of light emitting diodes, the target quantity of load units is a target quantity of light emitting diodes, and the series string of load units is a series string of light emitting diodes, the circuit further comprising: a controller configured to: output, to the feedforward module, the current quantity of light emitting diodes; determine the target quantity of light emitting diodes based on a head light mode of the circuit; output, to the feedforward module, the target quantity of light emitting diodes; output, to the load module, a control signal to switch one or more light emitting diodes of the plurality of light emitting diodes such that the series string of light emitting diodes has the target quantity of light emitting diodes.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various aspects have been described in this disclosure. These and other aspects are within the scope of the following claims.

The invention claimed is:

1. A voltage control system comprising:
   a load module configured to selectively bypass each load unit of a plurality of load units to form a series string of load units;
   a voltage module configured to receive, at a control input of the voltage module, an indication of a target voltage and supply an output voltage across the series string of load units that is based on the target voltage; and a controller configured to:
  determine a target quantity of load units used to form the series string of load units, the target quantity of load units being different from a current quantity of load units used to form the series string of load units;
  determine the target voltage based on the target quantity of load units;
  output, to the control input of the voltage module, the indication of the target voltage;
  estimate a time delay for switching one or more load units of the plurality of load units such that the series string of load units has the target quantity of load units; and
  output, after outputting the indication of the target voltage for the time delay and to the load module, a control signal to switch one or more load units of the plurality of load units such that the series string of load units has the target quantity of load units.

2. The voltage control system according to claim 1, wherein the controller is further configured to:
  estimate the time delay for switching one or more load units of the plurality of load units such that the series string of load units has the target quantity of load units based on the target voltage.

3. The voltage control system according to claim 2, further comprising:
  a capacitor,
  wherein the voltage module comprises:
    a compensator configured to supply energy to the capacitor based on the indication of the target voltage; and
    a modulator configured to control the output voltage across the series string of load units based on a voltage of the capacitor.

4. The voltage control system according to claim 3, wherein the controller is further configured to:
  receive an indication of the voltage of the capacitor; and
  estimate the time delay for switching one or more load units of the plurality of load units in the series string of load units based further on the voltage of the capacitor and a capacitance of the capacitor.

5. The voltage control system according to claim 4, wherein:
  the modulator is configured to control the output voltage across the series string of load units based on the voltage of the capacitor by outputting a switching signal indicating a duty cycle that is based on the voltage of the capacitor, and
  the voltage module further comprises:
    one or more energy storage elements; and
    a switching unit configured to selectively switch the one or more energy storage elements using the switching signal.

6. The voltage control system according to claim 1, wherein:
  the plurality of load units is a plurality of light emitting diodes;
  the target quantity of load units is a target quantity of light emitting diodes;
  the series string of load units is a series string of light emitting diodes; and
  determining the target quantity of load units used to form the series string of load units comprises:
    in response to determining that a headlight mode of the system corresponds to a high beam mode, determining the target quantity of light emitting diodes according to a quantity of light emitting diodes associated with the high beam mode; and
    in response to determining that a headlight mode of the system corresponds to a low beam mode, determining the target quantity of light emitting diodes according to a quantity of light emitting diodes associated with the low beam mode.

7. A voltage control method comprising:
  determining, by a processor, a target quantity of load units used to form the series string of load units, the target quantity of load units being different from a current quantity of load units used to form the series string of load units;
  determining, by the processor, a target voltage based on the target quantity of load units;
  outputting, by the processor and to a voltage module configured to supply an output voltage across the string of load units that is based on the target voltage, an indication of the target voltage;
  estimating, by the processor, a time delay for switching one or more load units such that the series string of load units has the target quantity of load units; and
  outputting, by the processor and to the load module, after outputting the indication of the target voltage for the time delay, a control signal to switch one or more load units such that the series string of load units has the target quantity of load units.

8. The voltage control method according to claim 7, further comprising:
  estimating, by the processor, the time delay for switching one or more load units such that the series string of load units has the target quantity of load units based on the target voltage.

9. The voltage control method according to claim 8, further comprising:
  receiving, by the processor, an indication of a voltage of a capacitor, the voltage module being configured to control the output voltage across the series string of load units based on the voltage of the capacitor,
  wherein the estimating of the time delay for switching one or more load units such that the series string of load units has the target quantity of load units is further based on the voltage of the capacitor.

10. The voltage control method according to claim 9, wherein the estimating of the time delay for switching one or more load units such that the series string of load units has the target quantity of load units is further based on a capacitance of the capacitor.

11. The voltage control method according to claim 10, further comprising:
  determining, by the processor, an indication of a current flowing from the capacitor,
  wherein the estimating of the time delay for switching one or more load units such that the series string of load units has the target quantity of load units is further based on the current flowing from the capacitor.

12. The voltage control method according to claim 11, further comprising:
  determining, by the processor, a difference between the target voltage and the voltage of the capacitor,
  wherein the estimating of the time delay for switching one or more load units such that the series string of load units has the target quantity of load units is further based on the difference between the target voltage and the voltage of the capacitor.

13. The voltage control method according to claim 7, further comprising:

outputting, by the processor, after outputting the indication of the target voltage and before outputting the control signal to switch one or more load units such that the series string of load units has the target quantity of load units, a control signal to switch one or more load units such that the series string of load units has the current quantity of load units.

14. A voltage control circuit comprising:
a load module configured to selectively bypass each load unit of a plurality of load units to form a series string of load units;
a voltage module configured to supply an output voltage across the series string of load units that is based on a voltage of a capacitor; and
a feedforward module configured to:
receive an indication of a current quantity of load units used to form the series string of load units;
receive an indication of a target quantity of load units used to form the series string of load units, the target quantity of load units being different from the current quantity of load units of the series string of load units;
detect the voltage of the capacitor;
output a target voltage for the capacitor that is based on the current quantity, the target quantity, and the voltage of the capacitor; and
modify, using the output, an energy level of the capacitor such that the voltage of the capacitor corresponds to the target voltage.

15. The voltage control circuit according to claim 14, wherein the feedforward module comprises:
a plurality of resistive elements coupled in series to form a series string of resistive elements;
an operational amplifier including a first input, a second input, and an output, the output of the operational amplifier being coupled to the series string of resistive elements;
a first set of switching elements configured to selectively couple the second input of the operation amplifier to a resistive element of the resistive elements corresponding to the current quantity of load units; and
a second set of switching elements configured to selectively couple an output of the second set of switching elements to a resistive element of the resistive elements corresponding to the target quantity of load units.

16. The voltage control circuit according to claim 15, wherein the feedforward module further comprises:
a first switching element configured to selectively couple the first input of the operation amplifier to the capacitor.

17. The voltage control circuit according to claim 16, wherein the feedforward module further comprises:
a second switching element configured to selectively couple the output of the second set of switches to the capacitor.

18. The voltage control circuit according to claim 14, wherein the feedforward module is further configured to:
add, to the output, an offset voltage indicating a mean current of the voltage module.

19. The voltage control circuit according to claim 14, wherein the voltage module comprises:
a modulator configured to control the output voltage across the series string of load units based on the voltage of the capacitor by outputting a switching signal indicating a duty cycle that is based on the voltage of the capacitor;
one or more energy storage elements; and
a switching unit configured to selectively switch the one or more energy storage elements using the switching signal.

20. The voltage control circuit according to claim 14, wherein the plurality of load units is a plurality of light emitting diodes, the current quantity of load units is a current quantity of light emitting diodes, the target quantity of load units is a target quantity of light emitting diodes, and the series string of load units is a series string of light emitting diodes, the circuit further comprising:
a controller configured to:
output, to the feedforward module, the current quantity of light emitting diodes;
determine the target quantity of light emitting diodes based on a head light mode of the circuit;
output, to the feedforward module, the target quantity of light emitting diodes;
output, to the load module, a control signal to switch one or more light emitting diodes of the plurality of light emitting diodes such that the series string of light emitting diodes has the target quantity of light emitting diodes.

* * * * *